US012704927B2

(12) United States Patent
Lee et al.

(10) Patent No.: US 12,704,927 B2
(45) Date of Patent: Aug. 11, 2026

(54) TOUCH SENSOR, METHOD OF DRIVING THE SAME, AND ELECTRONIC DEVICE INCLUDING THE SAME

(71) Applicant: Samsung Display Co., Ltd., Yongin-si (KR)

(72) Inventors: Seungrok Lee, Yongin-si (KR); Il Ho Lee, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 19/247,705

(22) Filed: Jun. 24, 2025

(65) Prior Publication Data

US 2026/0104772 A1 Apr. 16, 2026

(30) Foreign Application Priority Data

Oct. 15, 2024 (KR) ........................ 10-2024-0140138

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 2203/04107* (2013.01)

(58) Field of Classification Search
CPC ................ G06F 3/0418; G06F 3/0446; G06F 2203/04107
See application file for complete search history.

(56) References Cited

U.S. PATENT DOCUMENTS 8,314,779 B2 * 11/2012 Chan ................... G06F 3/04883 345/174
8,836,666 B2 * 9/2014 Brosnan ................ G06F 3/0443 345/174
2010/0214232 A1 * 8/2010 Chan ................... G06F 3/04182 345/173
2012/0105353 A1 * 5/2012 Brosnan ................ G06F 3/0443 345/174
2012/0256855 A1 * 10/2012 Chan ..................... G06F 3/0412 345/173

FOREIGN PATENT DOCUMENTS

KR 10-2543382 B1 6/2023

* cited by examiner

*Primary Examiner* — Michael Pervan
(74) *Attorney, Agent, or Firm* — Harness, Dickey & Pierce, P.L.C.

(57) ABSTRACT

A touch sensor includes a touch driver configured to generate a plurality of signals, and a plurality of channels configured to generate the plurality of signals, the plurality of channels including a driving channel configured to transmit a driving signal having a fundamental frequency, a first cancellation channel configured to transmit a first cancellation signal having the fundamental frequency and having an inverse phase of the driving signal, and a second cancellation channel configured to transmit a second cancellation signal having an harmonic frequency of the fundamental frequency and having an inverse phase of an harmonic frequency of the driving signal.

20 Claims, 11 Drawing Sheets

FIG. 6

| SIGNAL | FREQUENCY | CHANNEL | AMPLITUDE(V) | BURST(EA) | SIGNAL SUM |
|---|---|---|---|---|---|
| S1 | F | TCH1 | 1.5 | 10 | 90 |
| | | TCH2 | 1.5 | 10 | |
| | | TCH3 | 1.5 | 10 | |
| | | TCH4 | 1.5 | 10 | |
| | | TCH5 | 1.5 | 10 | |
| S2 | F | TCH6 | 1.5 | 10 | |
| S3 | F | TCH7 | 6 | 8 | 96 |
| | | TCH8 | 6 | 8 | |
| S4 | 3F | TCH9 | 9 | 5 | 45 |
| S5 | 5F | TCH10 | 9 | 3 | 27 |

DD
DV
TDV
DDV
TOUCH DRIVER
(T-IC)
DISPLAY DRIVER
(D-IC)
NDA
NSA
DA
PXL
SL
DSUB
DL
SA
TE
RE
BSL
TU
DP
PNL
DR1
DR2
DR3

TOUCH SENSOR, METHOD OF DRIVING THE SAME, AND ELECTRONIC DEVICE INCLUDING THE SAME

CROSS-REFERENCE TO RELATED APPLICATION(S)

This application claims priority under 35 USC § 119 to Korean Patent Application No. 10-2024-0140138 filed on Oct. 15, 2024, in the Korean Intellectual Property Office (KIPO), the entire disclosure of which is incorporated by reference herein.

BACKGROUND

1. Field

Some example embodiments relate to a touch sensor. More particularly, some example embodiments relate to a touch sensor that senses a touch, a method of driving the touch sensor, and/or an electronic device including the touch sensor.

2. Description of the Related Art

A display device may include a display panel and a touch sensor. The display panel may provide visual information to a user. The touch sensor may detect an input (e.g., touching and/or approaching with a conductive object) of the user.

SUMMARY

Some example embodiments provide a touch sensor in which electromagnetic interference is reduced, a method of driving the touch sensor, and an electronic device including the touch sensor.

A touch sensor according to some example embodiments includes a touch driver configured to generate a plurality of signals, and a plurality of channels configured to transmit the plurality of signals, the plurality of channels including a driving channel configured to transmit a driving signal having a fundamental frequency, a first cancellation channel configured to transmit a first cancellation signal having the fundamental frequency and having an inverse phase of the driving signal, and a second cancellation channel configured to transmit a second cancellation signal having an harmonic frequency of the fundamental frequency and having an inverse phase of an harmonic frequency of the driving signal.

In some example embodiments, the driving signal may be a square wave.

In some example embodiments, the first cancellation signal may be a square wave or a sine wave.

In some example embodiments, the second cancellation signal may be a square wave or a sine wave.

In some example embodiments, the harmonic frequency of the fundamental frequency may be an odd multiple of the fundamental frequency.

In some example embodiments, the plurality of channels may further include a guard channel configured to transmit a guard signal having the fundamental frequency and having a same phase as the driving signal.

In some example embodiments, the first cancellation signal may satisfy an inequality 0.9*(V_S1*B_S1*NUM_S1+V_S2*B_S2*NUM_S2)≤V_S3*B_S3*NUM_S3≤1.1*(V_S1*B_S1*NUM_S1+V_S2*B_S2*NUM_S2), wherein V_S1 is an amplitude of the driving signal, B_S1 is a burst of the driving signal, NUM_S1 is a number of the driving signal, V_S2 is an amplitude of the guard signal, B_S2 is a burst of the guard signal, NUM_S2 is a number of the guard signal, V_S3 is an amplitude of the first cancellation signal, B_S3 is a burst of the first cancellation signal, and NUM_S3 is a number of the first cancellation signal.

In some example embodiments, the second cancellation channel may include a second-first cancellation channel configured to transmit a second-first cancellation signal having a third harmonic frequency, the third harmonic frequency of the second-first cancellation signal being three times the fundamental frequency, and having an inverse phase of a third harmonic frequency of the driving signal, and a second-second cancellation channel configured to transmit a second-second cancellation signal having a fifth harmonic frequency, the fifth harmonic frequency of the second-second cancellation signal being five times the fundamental frequency, and having an inverse phase of a fifth harmonic frequency of the driving signal.

In some example embodiments, the second-first cancellation signal and the second-second cancellation signal may satisfy an inequality V_S3*B_S3*NUM_S3>V_S4*B_S4*NUM_S4>V_S5*B_S5*NUM_S5, wherein V_S4 is an amplitude of the second-first cancellation signal, B_S4 is a burst of the second-first cancellation signal, NUM_S4 is a number of the second-first cancellation signal, V_S5 is an amplitude of the second-second cancellation signal, B_S5 is a burst of the second-second cancellation signal, and NUM_S5 is a number of the second-second cancellation signal.

In some example embodiments, the first and second cancellation channels may be separated from the driving channel with the guard channel between the first and second cancellation channels and the driving channel.

A method of driving a touch sensor according to some example embodiments includes generating a driving signal having a fundamental frequency, generating a first cancellation signal having the fundamental frequency and having an inverse phase of the driving signal, generating a second cancellation signal having an harmonic frequency of the fundamental frequency and having an inverse phase of an harmonic frequency of the driving signal, and transmitting the driving signal, the first cancellation signal, and the second cancellation signal.

In some example embodiments, the driving signal may be a square wave.

In some example embodiments, the first cancellation signal may be a square wave or a sine wave.

In some example embodiments, the second cancellation signal may be a square wave or a sine wave.

In some example embodiments, the harmonic frequency of the fundamental frequency may be an odd multiple of the fundamental frequency.

In some example embodiments, the method may further include generating a guard signal having the fundamental frequency and having a same phase as the driving signal.

In some example embodiments, the first cancellation signal may satisfy an inequality 0.9*(V_S1*B_S1*NUM_S1+V_S2*B_S2*NUM_S2)≤V_S3*B_S3*NUM_S3≤1.1*(V_S1*B_S1*NUM_S1+V_S2*B_S2*NUM_S2), wherein, V_S1 is an amplitude of the driving signal, B_S1 is a burst of the driving signal, NUM_S1 is a number of the driving signal, V_S2 is an amplitude of the guard signal, B_S2 is a burst of the guard signal, NUM_S2 is a number of the guard signal, V_S3 is an amplitude of the first cancellation signal, B_S3 is a burst of the first cancellation signal, and NUM_S3 is a number of the first cancellation signal.

In some example embodiments, the generating the second cancellation signal may include generating a second-first cancellation signal having a third harmonic frequency, the third harmonic frequency of the second-first cancellation signal being three times the fundamental frequency and having an inverse phase of a third harmonic of the driving signal, and generating a second-second cancellation signal having a fifth harmonic frequency, the fifth harmonic frequency of the second-second cancellation signal being five times the fundamental frequency and having an inverse phase of a fifth harmonic frequency of the driving signal.

In some example embodiments, the second-first cancellation signal and the second-second cancellation signal may satisfy an inequality V_S3*B_S3*NUM_S3>V_S4*B_S4*NUM_S4>V_S5*B_S5*NUM_S5, wherein V_S4 is an amplitude of the second-first cancellation signal, B_S4 is a burst of the second-first cancellation signal, NUM_S4 is a number of the second-first cancellation signal, V_S5 is an amplitude of the second-second cancellation signal, B_S5 is a burst of the second-second cancellation signal, and NUM_S5 is a number of the second-second cancellation signal.

An electronic device according to some example embodiments includes a display device including a display panel and a touch sensor on the display panel, and a processor configured to provide input image data to the display device, the touch sensor including a touch driver configured to generate a plurality of signals, and a plurality of channels configured to transmit the plurality of signals, the plurality of channels including a driving channel configured to transmit a driving signal having a fundamental frequency, a first cancellation channel configured to transmit a first cancellation signal having the fundamental frequency and having an inverse phase of the driving signal, and a second cancellation channel configured to transmit a second cancellation signal having an harmonic frequency of the fundamental frequency and having an inverse phase of an harmonic frequency of the driving signal.

In the touch sensor, the method of driving the touch sensor, and the electronic device according to some example embodiments, the second cancellation channel is configured to transmit the second cancellation signal having the harmonic frequency of the fundamental frequency of the driving signal and having the inverse phase of the harmonic of the driving signal, so that the electromagnetic interference due to the harmonic of the driving signal may be reduced. Accordingly, the electromagnetic interference due to the touch sensor may be reduced.

BRIEF DESCRIPTION OF THE DRAWINGS

Illustrative, non-limiting example embodiments will be more clearly understood from the following detailed description taken in conjunction with the accompanying drawings.

FIG. 6 is a table for describing a driving signal, a guard signal, a first cancellation signal, a second-first cancellation signal, and a second-second cancellation signal.

DETAILED DESCRIPTION

Figure 1:
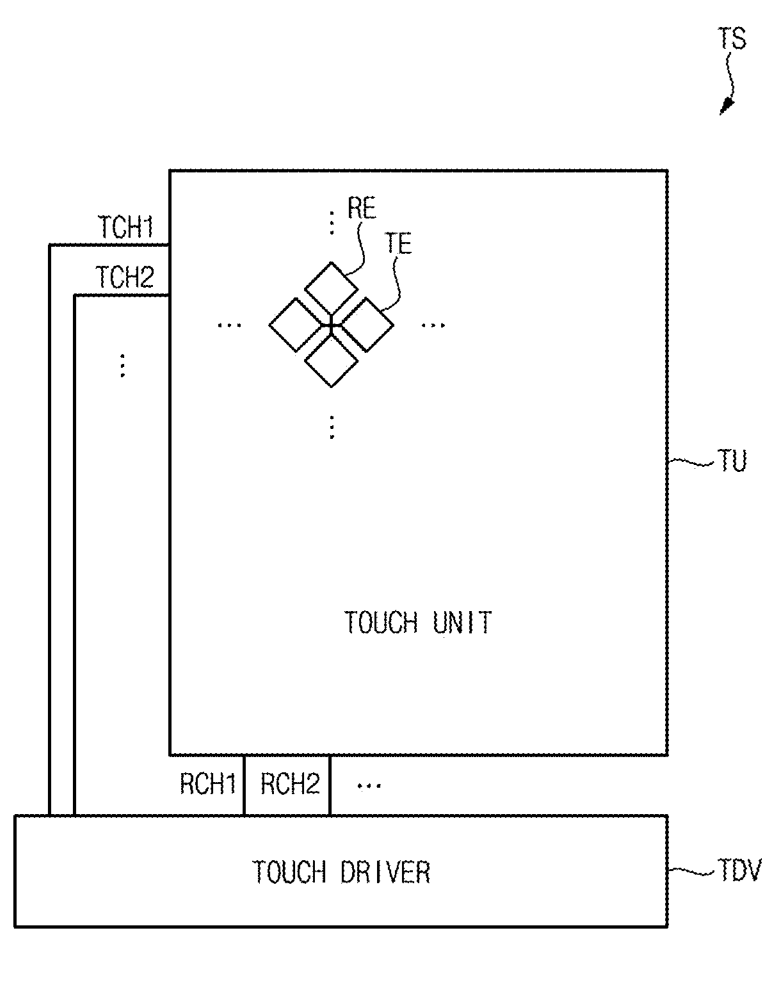
FIG. 1 is a block diagram illustrating a touch sensor according to some example embodiments.
Figure 1:
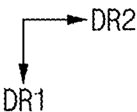

Hereinafter, a touch sensor, a method of driving a touch sensor, and an electronic device according to some example embodiments of the inventive concepts will be described in more detail with reference to the accompanying drawings. The same or similar reference numerals will be used for the same elements in the accompanying drawings.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%. Further, regardless of whether numerical values or shapes are modified as "about" or "substantially," it will be understood that these values and shapes should be construed as including a manufacturing or operational tolerance (e.g., ±10%) around the stated numerical values or shapes.

FIG. 1 is a block diagram illustrating a touch sensor TS according to some example embodiments.

Referring to FIG. 1, the touch sensor TS may include a touch unit TU, a touch driver TDV, transmission channels TCH1, TCH2, . . . , and reception channels RCH1, RCH2, . . . .

The touch unit TU may be a capacitance-type touch unit that senses a capacitance change due to a touch of a conductive object (e.g., a finger, a stylus pen, etc.). The touch unit TU may include transmission electrodes TE and/or reception electrodes RE. The transmission electrodes TE may be arranged in a first direction DR1, and may extend in a second direction DR2 intersecting the first direction DR1. The reception electrodes RE may be arranged in the second direction DR2, and may extend in the first direction DR1.

The touch driver TDV may drive the touch unit TU to detect a touch and/or approach of the conductive object. The touch driver TDV may generate a plurality of signals. The signals may include a driving signal, a guard signal, a first cancellation signal, and/or a second cancellation signal. The driving signal, the guard signal, the first cancellation signal, and the second cancellation signal are described below.

The touch driver TDV may drive the touch unit TU in a self-capacitance driving manner and/or a mutual capacitance driving manner. The touch driver TDV may perform a touch sensing operation in the self-capacitance driving manner by sensing a change in self-capacitances of the transmission electrodes TE (capacitances between the transmission electrodes TE and the conductive object) and a change in self-capacitances of the reception electrodes RE (capacitances between the reception electrodes RE and the conductive object). The touch driver TDV may perform a touch sensing operation in the mutual capacitance driving manner by sensing a change in mutual capacitances between the transmission electrodes TE and the reception electrodes RE.

The transmission channels TCH1, TCH2, . . . may transmit signals. In the self-capacitance driving manner, the transmission channels TCH1, TCH2, . . . may transmit signals generated by the touch driver TDV to the transmission electrodes TE, and may transmit sensing signals received from the transmission electrodes TE to the touch driver TDV. In the mutual capacitance driving manner, the transmission channels TCH1, TCH2, . . . may transmit the signals generated by the touch driver TDV to the transmission electrodes TE.

The reception channels RCH1, RCH2, . . . may transmit signals. In the self-capacitance driving method, the reception channels RCH1, RCH2, . . . may transmit signals generated by the touch driver TDV to the reception electrodes RE, and/or may transmit sensing signals received from the reception electrodes RE to the touch driver TDV. In the mutual capacitance driving method, the reception channels RCH1, RCH2, . . . may transmit the sensing signals received from the reception electrodes RE to the touch driver TDV.

Figure 2:
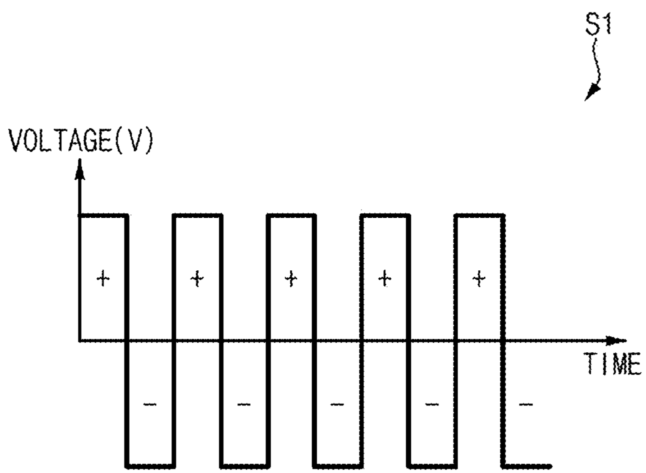
FIG. 2 is a waveform diagram illustrating a driving signal.
Figure 3:
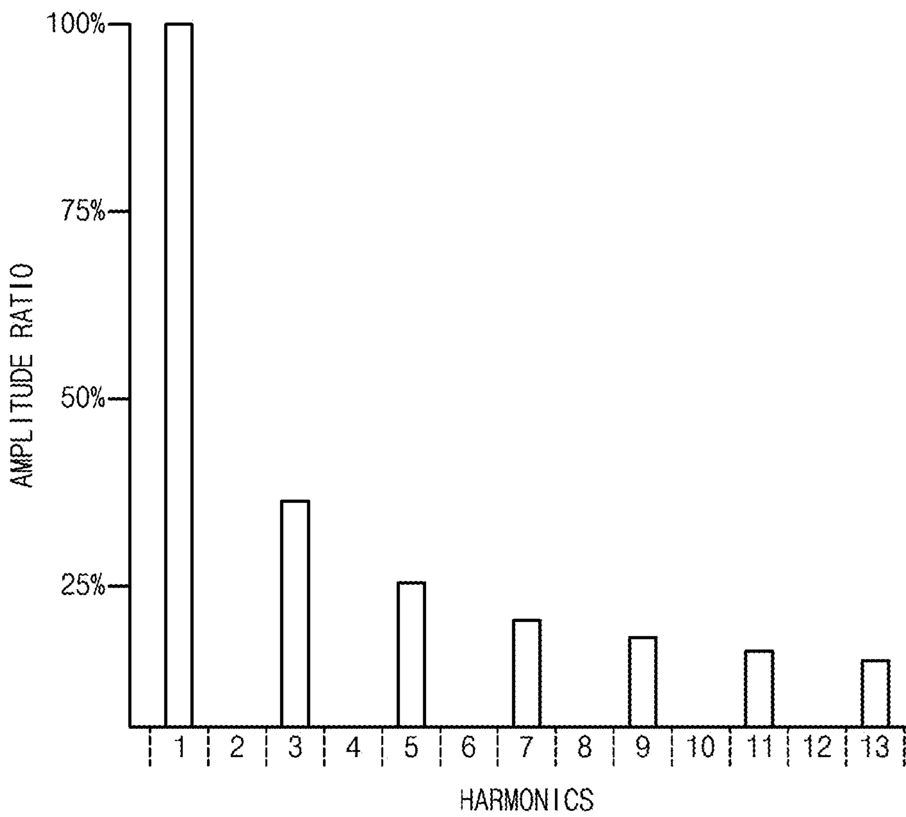
FIG. 3 is a diagram illustrating a spectrum of harmonics of the driving signal.

FIG. 2 is a waveform diagram illustrating a driving signal S1. FIG. 3 is a diagram illustrating a spectrum of harmonics of the driving signal S1.

Referring to FIGS. 1 to 3, the touch driver TDV may generate the driving signal S1 having a fundamental frequency. The driving signal S1 may be a signal for driving the touch unit TU. The driving signal S1 may be a square wave. The driving signal S1 may alternately have a constant positive voltage and a constant negative voltage.

The driving signal S1, which is the square wave, may have harmonics. The harmonic of the driving signal S1 may have a harmonic frequency of the fundamental frequency of the driving signal S1.

In some example embodiments, the harmonic frequency may be an odd multiple of the fundamental frequency. For example, as illustrated in FIG. 3, the driving signal S1 may include a third harmonic having a third harmonic frequency that is three times the fundamental frequency, a fifth harmonic having a fifth harmonic frequency that is five times the fundamental frequency, a seventh harmonic having a seventh harmonic frequency that is seven times the fundamental frequency, a ninth harmonic having a ninth harmonic frequency that is nine times the fundamental frequency, an eleventh harmonic having a eleventh harmonic frequency that is eleven times the fundamental frequency, a thirteenth harmonic having a thirteenth harmonic frequency that is thirteen times the fundamental frequency, etc. The amplitude of the third harmonic may be less than the amplitude of the driving signal S1, the amplitude of the fifth harmonic may be less than the amplitude of the third harmonic, the amplitude of the seventh harmonic may be less than the amplitude of the fifth harmonic, the amplitude of the ninth harmonic may be less than the amplitude of the seventh harmonic, the amplitude of the eleventh harmonic may be less than the amplitude of the ninth harmonic, and/or the amplitude of the thirteenth harmonic may be less than the amplitude of the eleventh harmonic.

Figure 8:
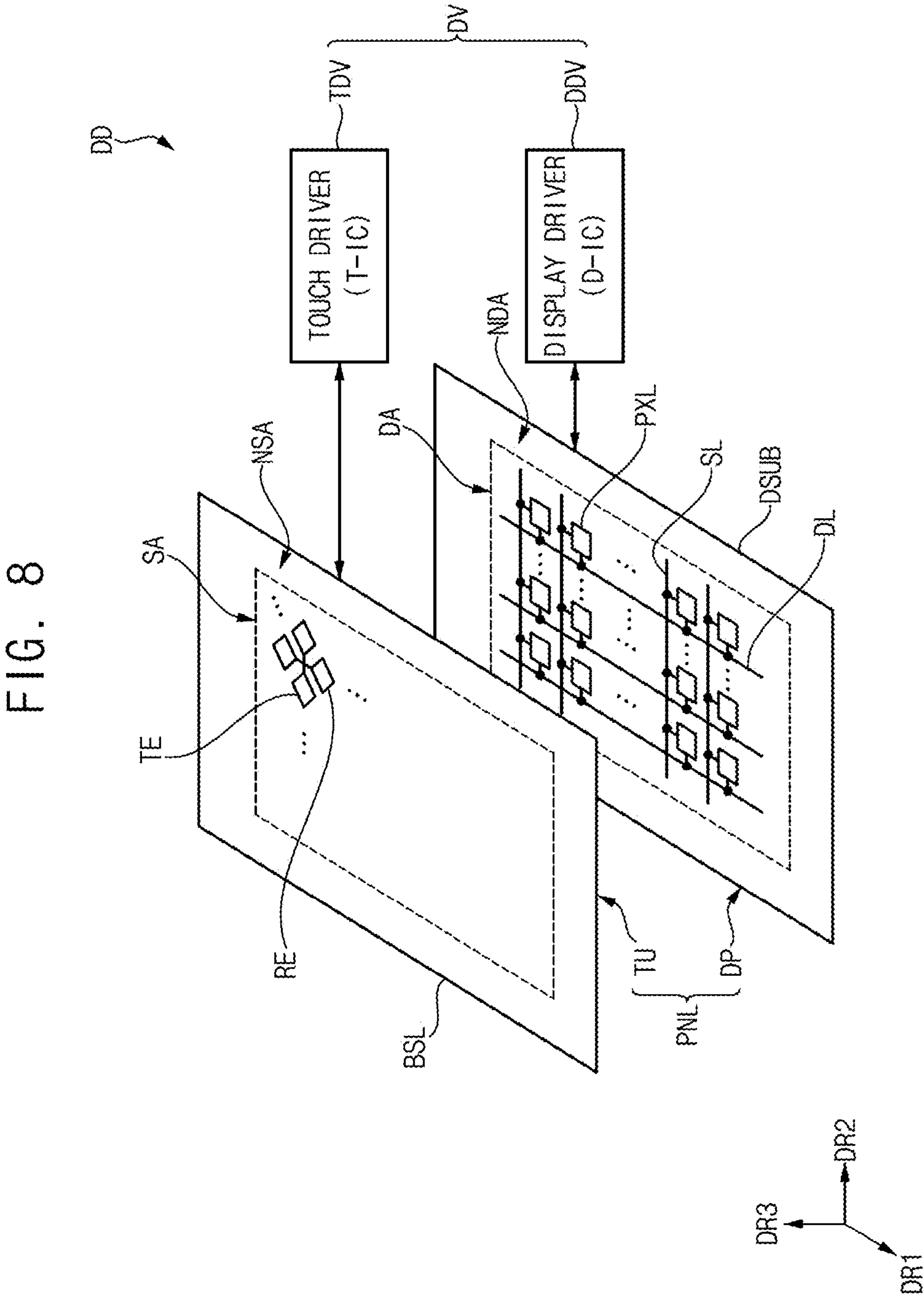
FIG. 8 is a diagram illustrating a display device according to some example embodiments.
Figure 9:
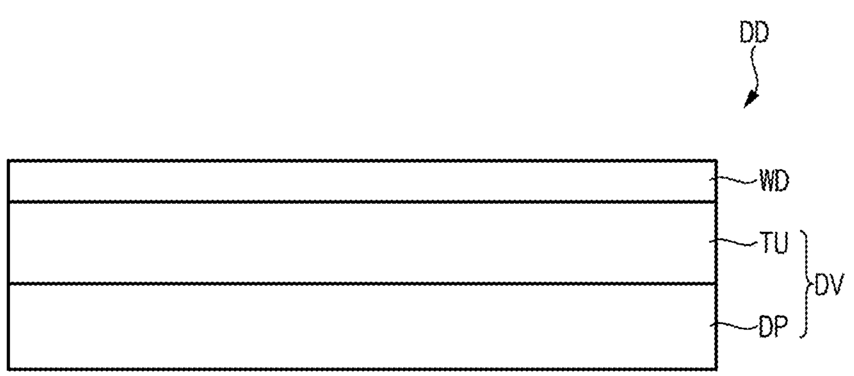
FIG. 9 is a cross-sectional view schematically illustrating the display device of FIG. 8.
Figure 10:
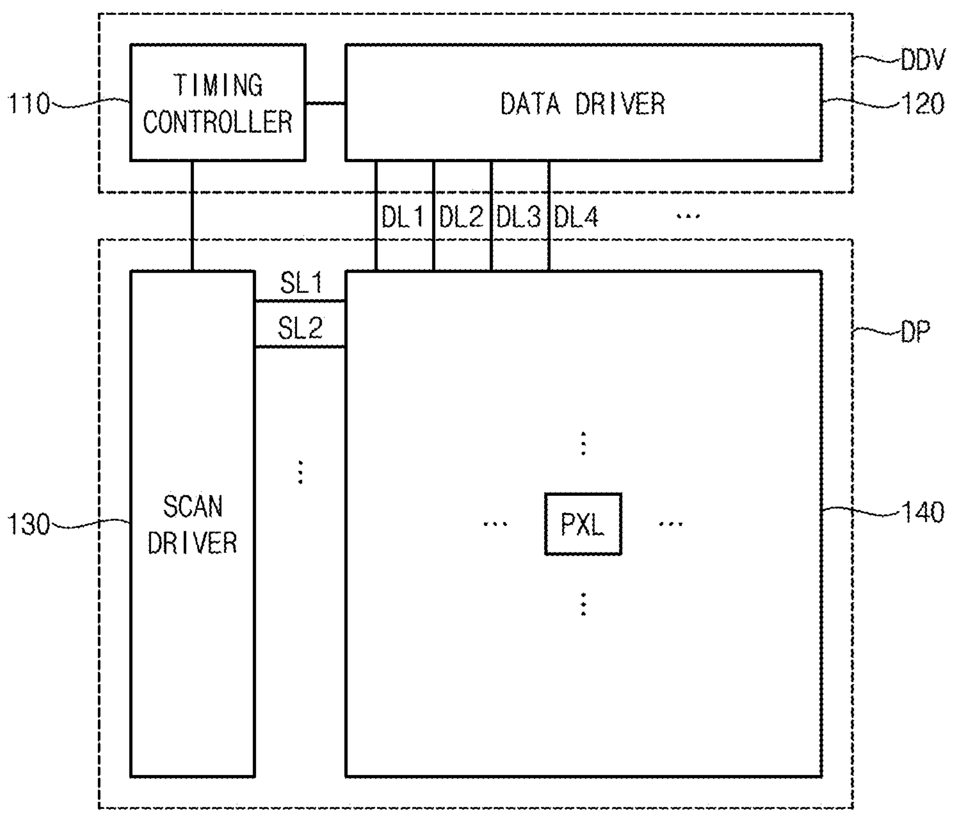
FIG. 10 is a block diagram illustrating a display panel and a display driver of FIG. 8.

When the driving signal S1 is transmitted for the operation of the touch sensor TS, the driving signal S1 may act as noise, causing electromagnetic interference EMI due to the driving signal S1. In some example embodiments, when the driving signal S1 is a square wave, electromagnetic interference may occur due to the harmonics of the driving signal S1. For example, electromagnetic interference due to the third harmonic and fifth harmonic of the driving signal S1, which have relatively large amplitudes among the harmonics of the driving signal S1, may occur. The electromagnetic interference due to the driving signal S1 may interfere with an operation of the touch sensor TS and/or an operation of a display panel DP (e.g. as shown in FIGS. 8-10).

Figure 4:
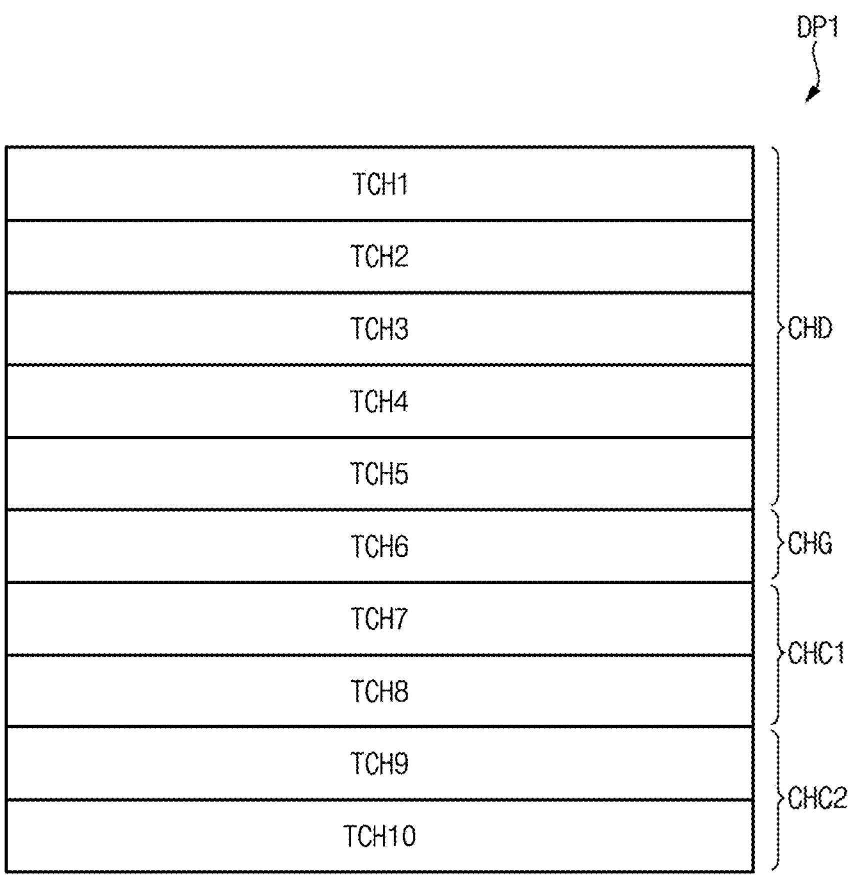
FIG. 4 is a diagram for describing transmission channels in a first driving period.
Figure 5:
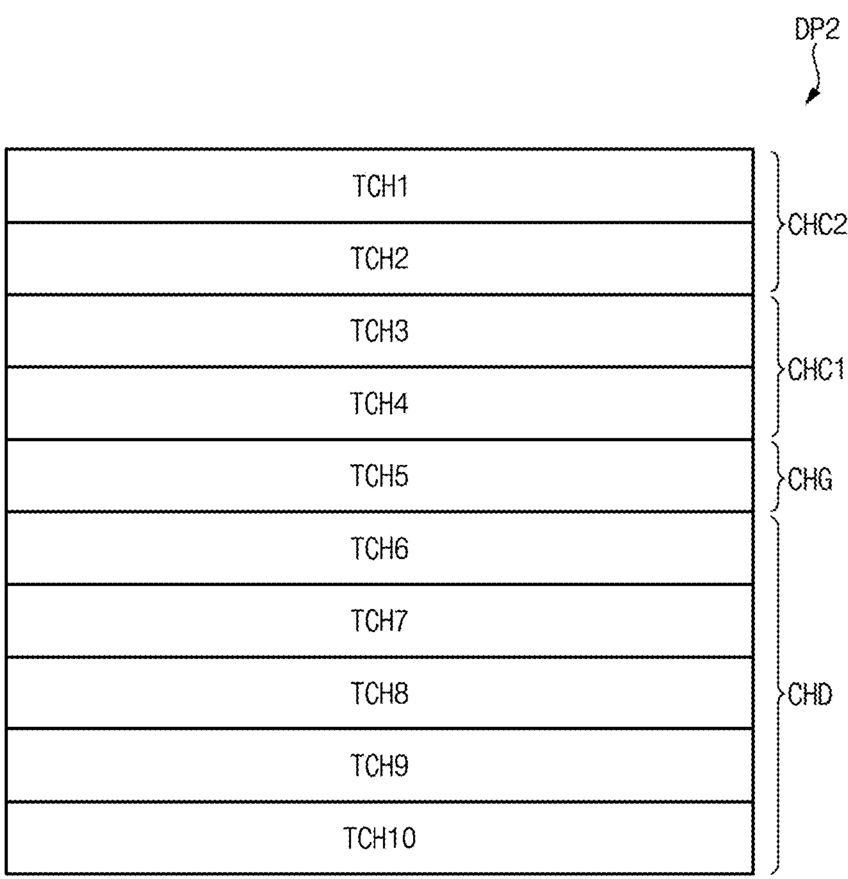
FIG. 5 is a diagram for describing transmission channels in a second driving period.

FIG. 4 is a diagram for describing the transmission channels TCH1, . . . , TCH10 in a first driving period DP1. FIG. 5 is a diagram for describing the transmission channels TCH1, . . . , TCH10 in a second driving period DP2. FIG. 6 is a table for describing the driving signal S1, a guard signal S2, a first cancellation signal S3, a second-first cancellation signal S4, and a second-second cancellation signal S5.

Referring to FIGS. 1, 4, 5, and 6, the touch driver TDV may alternately perform the first driving period DP1 and the second driving period DP2. The transmission channels TCH1, TCH2, . . . and/or the reception channels RCH1, RCH2, . . . may transmit signals generated by the touch driver TDV in the first driving period DP1 and/or the second driving period DP2.

Hereinafter, transmission of signals by the transmission channels TCH1, . . . , TCH10 is described with reference to FIGS. 4 to 6, but the present disclosure is not limited thereto, and the transmission of the signals by the transmission channels TCH1, . . . , TCH10 described with reference to FIGS. 4 to 6 may be substantially identically or similarly applied to transmission of signals by the reception channels RCH1, RCH2, . . . . In some example embodiments, the transmission of the signals by ten transmission channels TCH1, . . . , TCH10 is described with reference to FIGS. 4 to 6, but the number of transmission channels TCH1, . . . , TCH10 and/or the number of reception channels RCH1, RCH2, . . . are not limited thereto.

The transmission channels TCH1, . . . , TCH10 may include at least one driving channel CHD, at least one guard channel CHG, at least one first cancellation channel CHC1, and at least one second cancellation channel CHC2. In some example embodiments, half of the transmission channels TCH1, . . . , TCH10 may be driving channels CHD, and the remaining half of the transmission channels TCH1, . . . , TCH10 may include at least one guard channel CHG, at least one first cancellation channel CHC1, and at least one second cancellation channel CHC2. In some example embodiments, when the number of transmission channels TCH1, . . . , TCH10 is ten, the transmission channels TCH1, . . . , TCH10 may include five driving channels CHD, one guard channel CHG, two first cancellation channels CHC1, and/or two second cancellation channels CHC2.

Each, or one or more, of the driving channels CHD may transmit the driving signal S1. The driving signal S1 may have the fundamental frequency F.

Each, or one or more, of the first cancellation channels CHC1 may transmit the first cancellation signal S3. The first cancellation signal S3 may reduce electromagnetic interference caused by the driving signal S1. The first cancellation signal S3 may have the fundamental frequency F, and may have an inverse phase of the driving signal S1. For example, the first cancellation signal S3 may have a negative voltage in a period where the driving signal S1 has a positive voltage, and the first cancellation signal S3 may have a positive voltage in a period where the driving signal S1 has a negative voltage. In some example embodiments, the first cancellation signal S3 may be a square wave or a sine wave.

In some example embodiments, the first cancellation signal S3 may satisfy Inequality 1.

$$.9*(V\_S1*B\_S1*NUM\_S1+V\_S2*B\_S2*NUM\_S2) \leq V\_S3*B\_S3*NUM\_S3 \leq 1.1*(V\_S1*B\_S1*NUM\_S1+V\_S2*B\_S2*NUM\_S2 \quad \text{[Inequality 1]}$$

In Inequality 1, V_S1 may be the amplitude of the driving signal S1, B_S1 may be the burst of the driving signal S1, NUM_S1 may be the number of the driving signals S1, V_S2 may be the amplitude of the guard signal S2, B_S2 may be the burst of the guard signal S2, NUM_S2 may be the number of the guard signals S2, V_S3 may be the amplitude of the first cancellation signal S3, B_S3 may be the burst of the first cancellation signal S3, and NUM_S3 may be the number of the first cancellation signals S3. In some example embodiments, the driving channel may transmit a plurality of driving signals S1. The number of the signals may mean a number of the plurality of signals (e.g., 5 driving signals S1, 2 guard signals S2, etc.). The burst of the signal may mean the number of times the signal oscillates per unit time. In Inequality 1, V_S1*B_S1*NUM_S1+V_S2*B_S2*NUM_S2 may be a signal sum of the driving signals S1 and the guard signal S2, and V_S3*B_S3*NUM_S3 may be a signal sum of the first cancellation signals S3. The signal sum of the signals may correspond to a degree of electromagnetic interference caused by the signals.

To summarize Inequality 1, the first cancellation signal S3 may be set such that a difference between the signal sum of the first cancellation signal S3 and the signal sum of the driving signals S1 and the guard signal S2 is within ±10%. Accordingly, electromagnetic interference caused by the driving signals S1 and the guard signal S2 may be reduced or canceled by the first cancellation signals S3.

In some example embodiments, as illustrated in FIG. 6, when the amplitude V_S1 of the driving signal S1 is 1.5 V, the burst B_S1 of the driving signal S1 is 10, the amplitude V_S2 of the guard signal S2 is 1.5 V, and the burst B_S2 of the guard signal S2 is 10, to satisfy Inequality 1, the amplitude V_S3 of the first cancellation signal S3 may be set to 6 V, and the burst B_S3 of the first cancellation signal S3 may be set to 8.

Each, or one or more, of the second cancellation channels CHC2 may transmit the second cancellation signals S4/S5. The second cancellation signals S4/S5 may reduce electromagnetic interference caused by the harmonic of the driving signal S1. The second cancellation signals S4/S5 may have a harmonic frequency of the fundamental frequency F, and may have an inverse phase of the harmonic of the driving signal S1 having the harmonic frequency. For example, the second cancellation signals S4/S5 may have a negative voltage in a period where the harmonic of the driving signal S1 has a positive voltage, and the second cancellation signals S4/S5 may have a positive voltage in a period where the harmonic of the driving signal S1 has a negative voltage. In some example embodiments, the second cancellation signals S4/S5 may be a square wave or a sine wave.

In some example embodiments, the second cancellation channels CHC2 may include a second-first cancellation channel and/or a second-second cancellation channel. The second-first cancellation channel may transmit a second-first cancellation signal S4. The second-first cancellation signal S4 may have a third harmonic frequency that is three times the fundamental frequency F, and may have an inverse phase of the third harmonic of the driving signal S1 having the third harmonic frequency. For example, the second-first cancellation signal S4 may have a negative voltage in a period where the third harmonic of the driving signal S1 has a positive voltage, and the second-first cancellation signal S4 may have a positive voltage in a period where the third harmonic of the driving signal S1 has a negative voltage.

The second-second cancellation channel may transmit a second-second cancellation signal S5. The second-second cancellation signal S5 may have a fifth harmonic frequency that is five times the fundamental frequency F, and may have an inverse phase of the fifth harmonic of the driving signal S1 having the fifth harmonic frequency. For example, the second-second cancellation signal S5 may have a negative voltage in a period where the fifth harmonic of the driving signal S1 has a positive voltage, and the second-second cancellation signal S5 may have a positive voltage in a period where the fifth harmonic of the driving signal S1 has a negative voltage.

In some example embodiments, the second-first cancellation signal S4 and/or the second-second cancellation signal S5 may satisfy Inequality 2.

$$V\_S3*B\_S3*NUM\_S3 > V\_S4*B\_S4*NUM\_S4 > V\_S5*B\_S5*NUM\_S5 \quad \text{[Inequality 2]}$$

In Inequality 2, V_S4 may be the amplitude of the second-first cancellation signal S4, B_S4 may be the burst of the second-first cancellation signal S4, NUM_S4 may be the number of the second-first cancellation signals S4, V_S5 may be the amplitude of the second-second cancellation signal S5, B_S5 may be the burst of the second-second cancellation signal S5, and NUM_S5 may be the number of the second-second cancellation signals S5. In Inequality 2, V_S4*B_S4*NUM_S4 may be a signal sum of the second-first cancellation signal S4, and V_S3*B_S3*NUM_S3 may be a signal sum of the second-second cancellation signal S5. In some example embodiments, the second cancellation channels CHC2 may transmit a plurality of second-first cancellation signals S4 and/or a plurality of second-second cancellation signals S5. The number of the signals may mean a number (e.g., how many) of the plurality of signals.

To summarize Inequality 2, the second-first cancellation signal S4 may be set such that the signal sum of the second-first cancellation signal S4 is less than the signal sum of the first cancellation signals S3, and the second-second cancellation signal S5 may be set such that the signal sum of the second-second cancellation signal S5 is less than the signal sum of the second-first cancellation signal S4. Accordingly, electromagnetic interference by the third harmonic of the driving signal S1 having an amplitude less than the amplitude of the driving signal S1 may be reduced or canceled by the second-first cancellation signal S4, and electromagnetic interference by the fifth harmonic of the driving signal S1 having an amplitude less than the amplitude of the third harmonic of the driving signal S1 may be reduced or canceled by the second-second cancellation signal S5. Thus, according to some example embodiments, the electromagnetic interference caused by the driving signal S1, the third harmonic of the driving signal S1, and/or the fifth harmonic of the driving signal S1 may be reduced and/or cancelled and an operation of the touch sensor TS and/or the display panel may be improved. For example, the touch sensor TS may more accurately detect a touch and/or approach of a conductive object and/or the display panel DP may display a clearer image.

In some example embodiments, as illustrated in FIG. 6, when the amplitude V_S3 of the first cancellation signal S3 is set to 6 V and the burst B_S3 of the first cancellation signal S3 is set to 8, to satisfy Inequality 2, the amplitude V_S4 of the second-first cancellation signal S4 may be set to 9 V, the burst B_S4 of the second-first cancellation signal S4 may be set to 5, the amplitude V_S5 of the second-second cancellation signal S5 may be set to 9 V, and the burst B_S5 of the second-second cancellation signal S5 may be set to 3.

The guard channel CHG may transmit the guard signal S2. The guard signal S2 may reduce or prevent the first cancellation signal S3 and/or the second cancellation signals S4/S5 from affecting the driving signal S1. The guard signal S2 may have the fundamental frequency F, and may have the same phase as the driving signal S1. In some example embodiments, a waveform of the guard signal S2 may be substantially the same as a waveform of the driving signal S1.

The first cancellation channels CHC1 and the second cancellation channels CHC2 may be separated from the driving channels CHD with the guard channel CHG positioned between the first and second cancellation channels CHC1 and CHC2 and the driving channels CHD. For example, in the first driving period DP1, the first to fifth transmission channels TCH1, . . . , TCH5 may be allocated as the driving channels CHD, the sixth transmission channel TCH6 may be allocated as the guard channel CHG, the seventh and eighth transmission channels TCH7 and TCH8 may be allocated as the first cancellation channels CHC1, and the ninth and tenth transmission channels TCH9 and TCH10 may be allocated as the second cancellation channels CHC2. In some example embodiments, in the second driving period DP2, the sixth to tenth transmission channels TCH6, . . . , TCH10 may be allocated as the driving channels CHD, the fifth transmission channel TCH5 may be allocated as the guard channel CHG, the third and fourth transmission channels TCH3 and TCH4 may be allocated as the first cancellation channels CHC1, and the first and second transmission channels TCH1 and TCH2 may be allocated as the second cancellation channels CHC2.

Figure 7:
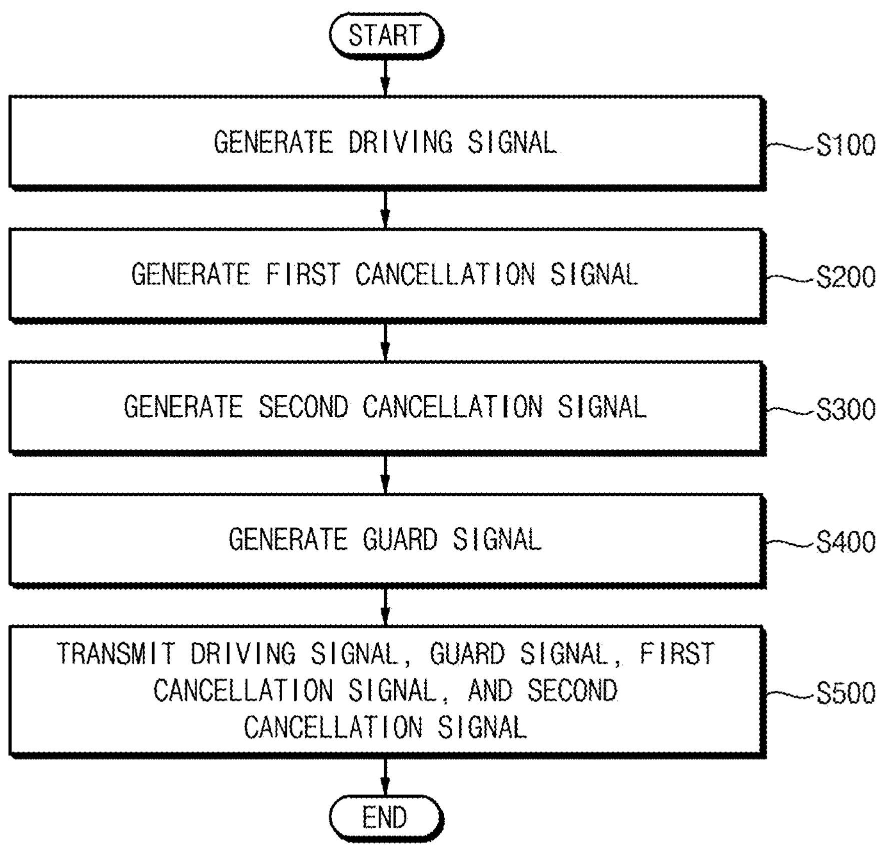
FIG. 7 is a flowchart illustrating a method of driving a touch sensor according to some example embodiments.

FIG. 7 is a flowchart illustrating a method of driving a touch sensor according to some example embodiments.

Referring to FIGS. 1 and 4 to 7, in the method of driving the touch sensor TS, the touch driver TDV may generate a driving signal S1 (S100). The driving signal S1 may have the fundamental frequency F. The driving signal S1 may be a square wave.

The touch driver TDV may generate the first cancellation signal S3 (S200). The first cancellation signal S3 may have the fundamental frequency F, and may have an inverse phase of the driving signal S1. In some example embodiments, the first cancellation signal S3 may be a square wave or a sine wave. In some example embodiments, the touch driver TDV may set the amplitude and/or burst of the first cancellation signal S3 to satisfy Inequality 1.

The touch driver TDV may generate the second cancellation signals S4/S5 (S300). The second cancellation signals S4/S5 may have a harmonic frequency of the fundamental frequency F, and may have an inverse phase of a harmonic of the driving signal S1 having the harmonic frequency. In some example embodiments, the second cancellation signals S4/S5 may be a square wave or a sine wave.

In some example embodiments, the touch driver TDV may generate the second-first cancellation signal S4 and/or the second-second cancellation signal S5. The second-first cancellation signal S4 may have a third harmonic frequency that is three times the fundamental frequency F, and may have an inverse phase of a third harmonic of the driving signal S1 having the third harmonic frequency. The second-second cancellation signal S5 may have a fifth harmonic frequency that is five times the fundamental frequency F, and may have an inverse phase of a fifth harmonic of the driving signal S1 having the fifth harmonic frequency. In some example embodiments, the touch driver TDV may set the amplitude and/or burst of the second-first cancellation signal S4 and/or the amplitude and/or burst of the second-second cancellation signal S5 to satisfy Inequality 2.

The touch driver TDV may generate the guard signal S2 (S400). The guard signal S2 may have the fundamental frequency F, and may have the same phase as the driving signal S1. In some example embodiments, the waveform of the guard signal S2 may be substantially the same as the waveform of the driving signal S1.

The channels may transmit the driving signal S1, the guard signal S2, the first cancellation signal S3, and/or the second cancellation signals S4/S5 (S500). Each, or one or more, of the driving channels CHD may transmit the driving signal S1, the guard channel CHG may transmit the guard signal S2, each, or one or more, of the first cancellation channels CHC1 may transmit the first cancellation signal S3, and each, or one or more, of the second cancellation channels CHC2 may transmit the second cancellation signals S4/S5.

In some example embodiments, in the first driving period DP1, each, or one or more, of the first to fifth transmission channels TCH1, . . . , TCH5 may transmit the driving signal S1, the sixth transmission channel TCH6 may transmit the guard signal S2, each, or one or more, of the seventh and/or eighth transmission channels TCH7 and/or TCH8 may transmit the first cancellation signal S3, and/or each, or one or more, of the ninth and/or tenth transmission channels TCH9 and/or TCH10 may transmit the second cancellation signals S4/S5. In some example embodiments, in the second driving period DP2, each, or one or more, of the sixth to tenth transmission channels TCH6, . . . , TCH10 may transmit the driving signal S1, the fifth transmission channel TCH5 may transmit the guard signal S2, each, or one or more, of the third and/or fourth transmission channels TCH3 and/or TCH4 may transmit the first cancellation signal S3, and/or each, or one or more, of the first and/or second transmission channels TCH1 and/or TCH2 may transmit the second cancellation signals S4/S5.

FIG. 8 is a diagram illustrating a display device DD according to some example embodiments.

Referring to FIG. 8, the display device DD may include a panel PNL and/or a driver DV. The driver DV may drive the panel PNL.

The panel PNL may include a display panel DP and/or a touch unit TU. The display panel DP may display an image. The touch unit TU may detect a touch and/or approach of a conductive object. The touch unit TU may correspond to the touch unit TU of FIG. 1.

The driver DV may include a display driver DDV and/or a touch driver TDV. The display driver DDV may drive the display panel DP. The touch driver TDV may drive the touch unit TU. The touch driver TDV may correspond to the touch driver TDV of FIG. 1.

In some example embodiments, the display panel DP and the touch unit TU may be manufactured separately and then combined. In some example embodiments, the display panel DP and the touch unit TU may be manufactured integrally. For example, the touch unit TU may be formed directly on the display panel DP.

The display panel DP may include a display substrate DSUB, scan lines SL, data lines DL, and/or pixels PXL.

The display substrate DSUB may include a display area DA and/or a non-display area NDA. An image may be displayed in the display area DA, and the non-display area NDA may be adjacent to the display area DA. In some example embodiments, the display area DA may be positioned in a central area of the display substrate DSUB, and the non-display area NDA may be positioned in an edge area of the display substrate DSUB to surround the display area DA.

The display substrate DSUB may be a rigid substrate or a flexible substrate. For example, the display substrate DSUB may be a rigid substrate including glass and/or tempered glass, or a flexible substrate including a thin film of plastic and/or metal material.

The scan lines SL, the data lines DL, and/or the pixels PXL may be positioned in the display area DA. The scan lines SL may extend in the second direction DR2, and may be arranged in the first direction DR1. The data lines DL may extend in the first direction DR1, and may be arranged in the second direction DR2. The pixels PXL may be connected to the scan lines SL and/or the data lines DL. The pixels PXL may be selected by scan signals provided from the scan lines SL, and may emit light corresponding to data signals provided from the data lines DL. Accordingly, an image corresponding to the data signals may be displayed in the display area DA.

The touch unit TU may include a base layer BSL, the transmission electrodes TE, and/or the reception electrodes RE.

The base layer BSL may include a sensing area SA and/or a non-sensing area NSA. The sensing area SA may detect a touch and/or approach of a conductive object, and the non-sensing area NSA may be adjacent to the sensing area SA. In some example embodiments, the sensing area SA may overlap the display area DA, and the non-sensing area NSA may overlap the non-display area NDA.

The transmission electrodes TE and/or the reception electrodes RE may be positioned in the sensing area SA on the base layer BSL. In some example embodiments, each, or one or more, of the transmission electrodes TE may have a form in which transmission cells and transmission bridges are alternately connected along the second direction DR2. Although the transmission cell is illustrated as having a diamond shape in FIG. 8, the transmission cell may have a circular, rectangular, triangular, mesh-shaped, etc. In some example embodiments, each, or one or more, of the reception electrodes RE may have a form in which reception cells and reception bridges are alternately connected along the first direction DR1. Although the reception cell is illustrated as having a diamond shape in FIG. 8, the reception cell may have a circular, rectangular, triangular, mesh-shaped, etc.

FIG. 9 is a cross-sectional view schematically illustrating the display device DD of FIG. 8.

Referring to FIG. 9, the touch unit TU may be positioned on the display panel DP, and a window WD may be positioned on the touch unit TU (or the panel PNL).

In some example embodiments, the display panel DP may be a self-luminous display panel. For example, the display panel DP may be an organic light-emitting display panel, an inorganic light-emitting display panel, a quantum dot light-emitting display panel, etc. In some example embodiments, the display panel DP may be a non-luminous display panel. For example, the display panel DP may be a liquid crystal display panel, etc. When the display panel DP is the non-luminous display panel, the display device DD may further include a light source such as a backlight unit, etc.

The touch unit TU may detect a touch and/or approach of a conductive object. In some example embodiments, the touch unit TU may detect the touch and/or approach of the conductive object using a capacitance manner. For example, the touch unit TU may detect the touch and/or approach of the conductive object in a self-capacitance driving manner and/or a mutual capacitance driving manner.

The window WD may protect the panel PNL, and may transmit light. The window WD may have a multilayer structure selected from a glass substrate, a plastic film, a plastic substrate, etc. The window WD may include a rigid or flexible material.

Although not illustrated in FIG. 9, the display device DD may further include a polarizing plate, etc., positioned between the window WD and the touch unit TU. The polarizing plate may reduce or prevent reflection of external light passing through the window WD.

FIG. 10 is a block diagram illustrating the display panel DP and the display driver DDV of FIG. 8.

Referring to FIG. 10, the display driver DDV may include a timing controller 110 and/or a data driver 120, and the display panel DP may include a scan driver 130 and/or a pixel array 140.

Figure 12:
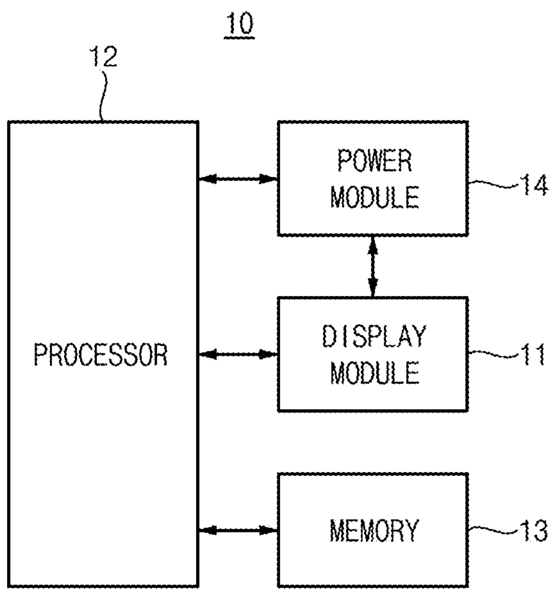
FIG. 12 is a block diagram illustrating an electronic device according to some example embodiments.

The timing controller 110 may receive input image data and/or an input control signal from an external device (e.g., a processor 12 of FIG. 12). The input control signal may include a vertical synchronization signal, a horizontal synchronization signal, a data enable signal, etc.

The data driver 120 may generate the data signals based on output image data and/or a data control signal provided from the timing controller 110. The data driver 120 may output the data signals to the data lines DL1, DL2, DL3, DL4, . . . .

The scan driver 130 may generate the scan signals based on a scan start signal, a scan clock signal, etc. provided from the timing controller 110. The scan driver 130 may sequentially output the scan signals to the scan lines SL1, SL2, . . . . The scan driver 130 may include scan stages configured in the form of a shift register.

The pixel array 140 may include the pixels PXL. The pixels PXL may include first pixels emitting light of a first color, second pixels emitting light of a second color, and/or third pixels emitting light of a third color. The first color, the second color, and/or the third color may be different colors. In some example embodiments, the first color, the second color, and/or the third color may be red, green, and blue, respectively. In some example embodiments, the first color, the second color, and/or the third color may be magenta, cyan, and/or yellow, respectively.

Figure 11:
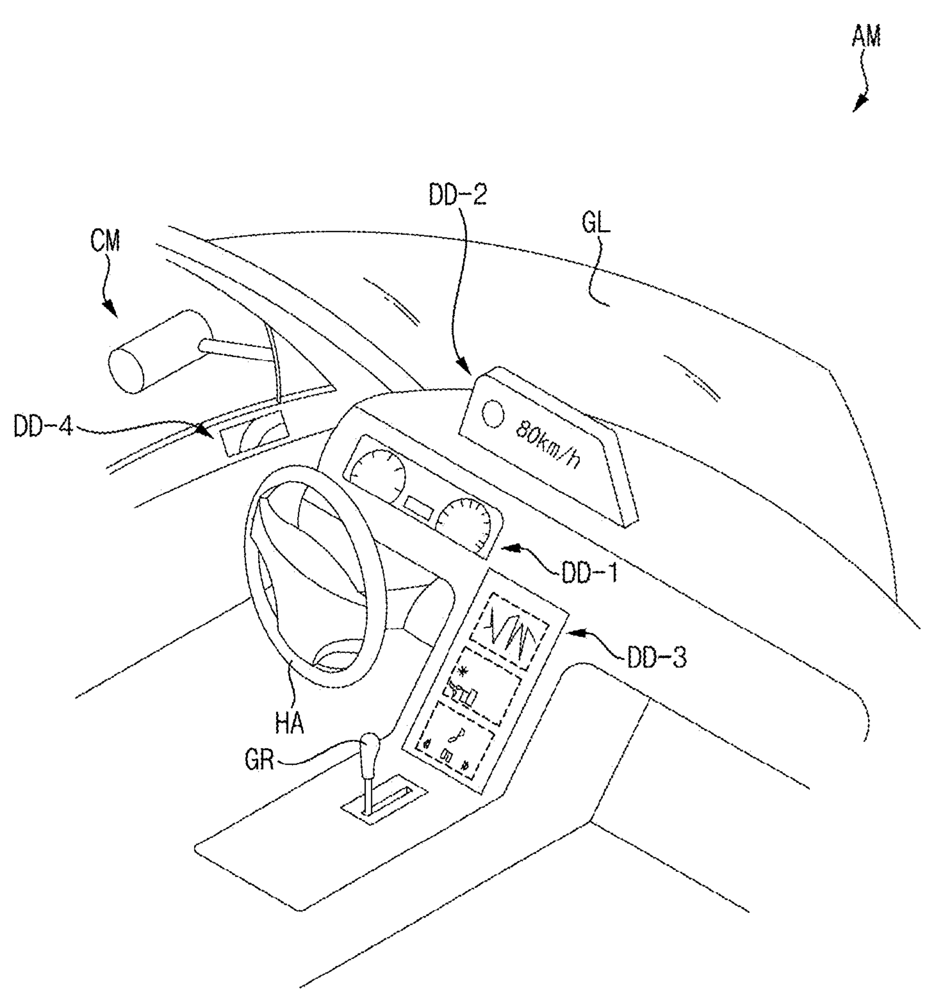
FIG. 11 is a diagram illustrating an inside of a vehicle including the display device of FIG. 8.

FIG. 11 is a diagram illustrating an inside of a vehicle AM including the display device DD of FIG. 8.

Referring to FIG. 11, the vehicle AM may include at least one display device DD-1, DD-2, DD-3, and/or DD-4 positioned inside the vehicle AM. For example, as illustrated in FIG. 11, the vehicle AM may include first to fourth display devices DD-1, DD-2, DD-3, and/or DD-4. Although an automobile is illustrated as the vehicle AM in FIG. 11, example embodiments are not limited thereto, and the vehicle AM may be another means of transportation such as a bicycle, a motorcycle, a train, a ship, an airplane, etc. At least one of the first to fourth display devices DD-1, DD-2, DD-3, and/or DD-4 may correspond to the display device DD of FIG. 8.

The vehicle AM may include a handle HA and/or a gear GR for operating the vehicle AM, and a front window GL may be positioned in front of a driver such that the driver may look out.

The first display device DD-1 may be positioned in a first area overlapping the handle HA. For example, the first display device DD-1 may be a digital cluster that displays first information of the vehicle AM. The first information may include a scale indicating a driving speed of the vehicle AM, a scale indicating an engine rotation speed, an image indicating a fuel status, etc. The scale may be displayed as a digital image.

The second display device DD-2 may be positioned in a second area facing a driver's seat and overlapping the front window GL. The driver's seat may be a seat where the handle HA is positioned. For example, the second display device DD-2 may be a head up display HUD that displays second information of the vehicle AM. The second display device DD-2 may be optically transparent. The second information may include digital numbers indicating the driving speed of the vehicle AM, a current time, etc. Unlike the illustration in FIG. 11, the second information of the second display device DD-2 may be projected and displayed on the front window GL.

The third display device DD-3 may be positioned in a third area adjacent to the gear GR. For example, the third display device DD-3 may be a center information display CID positioned between the driver's seat and a passenger's seat and displaying third information. The passenger's seat may be separated from the driver's seat by the gear GR. The third information may include information about a travel path of the vehicle AM, music and/or radio playback, dynamic image playback, a temperature inside the vehicle AM, etc.

The fourth display device DD-4 may be positioned in a fourth area adjacent to a side of the vehicle AM and spaced from the handle HA and the gear GR. For example, the fourth display device DD-4 may be a side mirror display displaying fourth information. The fourth display device DD-4 may display an image of an outside of the vehicle AM captured by a camera module CM positioned outside the vehicle AM. The fourth information may include an image of the outside of the vehicle AM.

FIG. 12 is a block diagram illustrating an electronic device 10 according to some example embodiments.

Referring to FIG. 12, an electronic device 10 may include a display module 11, a processor 12, a memory 13, and/or a power module 14.

The processor 12 may include at least one of a central processing unit (CPU), an application processor (AP), a graphic processing unit (GPU), a communication processor (CP), an image signal processor (ISP), and/or a controller.

The memory 13 may store data information necessary for an operation of the processor 12 and/or the display module 11. When the processor 12 executes an application stored in the memory 13, the input image data and/or the input control signal may be transmitted to the display module 11, and the display module 11 may output image information based on the input image data and/or the input control signal.

The power module 14 may include a power supply module such as a power adapter, a battery device, etc. and a power conversion module that converts power supplied by the power supply module to generate power required for an operation of the electronic device 10.

At least one of the components of the electronic device 10 described above may be included in the display device DD of FIG. 8 according to the example embodiments described above. In some example embodiments, some of individual modules functionally included in one module may be included in the display device DD, and others may be provided separately from the display device DD. For example, the display device 100 may include the display module 11, and/or the processor 12, the memory 13, and/or the power module 14 may be provided in the form of other devices within the electronic device 10 other than the display device DD.

Figure 13:
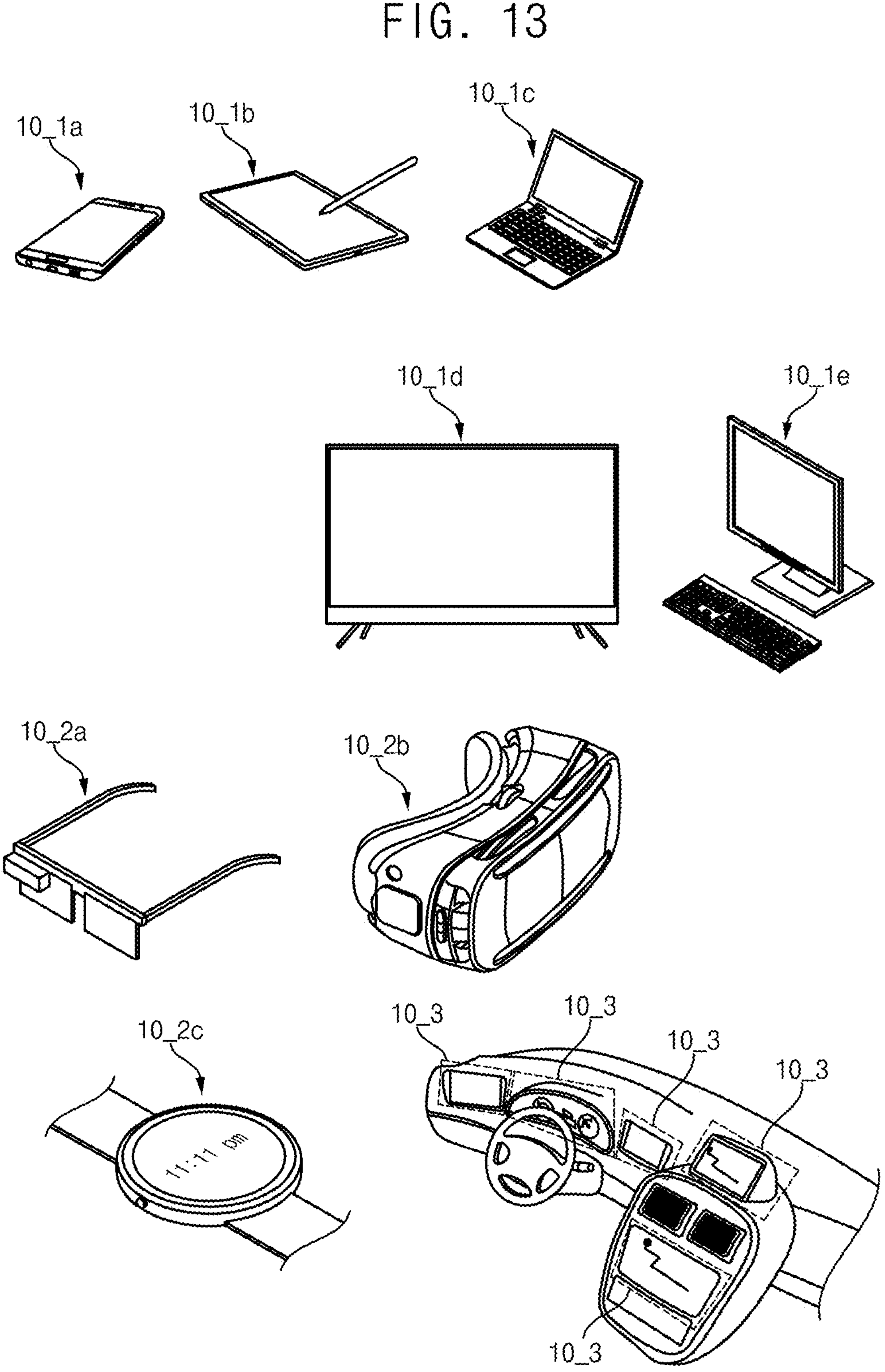
FIG. 13 is a diagram illustrating electronic devices according to some example embodiments.

FIG. 13 is a diagram illustrating electronic devices according to some example embodiments.

Referring to FIG. 13, electronic devices to which display devices according to some example embodiments are applied may include not only image display electronic devices such as a smart phone 10_1*a*, a tablet PC 10_1*b*, a laptop 10_1*c*, a TV 10_1*d*, a desk monitor 10_1*e*, etc. but also wearable electronic devices including display modules such as smart glasses 10_2*a*, a head mounted display 10_2*b*, a smart watch 10_2*c*, etc., vehicle electronic devices 10_3 including display modules such as an instrument panel of an automobile, a center fascia, a center information display CID arranged on a dashboard, a room mirror display, etc.

The display device according to some example embodiments may be applied to a display device included in a computer, a notebook, a mobile phone, a smart phone, a smart pad, a smart watch, a PMP, a PDA, an MP3 player, and/or the like.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Although the touch sensor, the method of driving the touch sensor, and the electronic device according to some example embodiments have been described with reference to the drawings, the illustrated embodiments are examples, and may be modified and changed by a person having ordinary knowledge in the relevant technical field without departing from the technical spirit described in the following claims.

What is claimed is:

1. A touch sensor comprising:

a touch driver configured to generate a plurality of signals; and a plurality of channels configured to transmit the plurality of signals, the plurality of channels including:

a driving channel configured to transmit a driving signal having a fundamental frequency;

a first cancellation channel configured to transmit a first cancellation signal having the fundamental frequency and having an inverse phase of the driving signal; and a second cancellation channel configured to transmit a second cancellation signal having an harmonic frequency of the fundamental frequency and having an inverse phase of an harmonic frequency of the driving signal.

2. The touch sensor of claim 1, wherein the driving signal is a square wave.

3. The touch sensor of claim 2, wherein the first cancellation signal is a square wave or a sine wave.

4. The touch sensor of claim 2, wherein the second cancellation signal is a square wave or a sine wave.

5. The touch sensor of claim 1, wherein the harmonic frequency of the fundamental frequency is an odd multiple of the fundamental frequency.

6. The touch sensor of claim 1, wherein the plurality of channels further include:

a guard channel configured to transmit a guard signal having the fundamental frequency and having a same phase as the driving signal.

7. The touch sensor of claim 6, wherein the first cancellation signal satisfies an inequality $$0.9*(V\_S1*B\_S1*NUM\_S1+V\_S2*B\_S2*NUM\_S2)\leq V\_S3*B\_S3*NUM\_S3\leq 1.1*(V\_S1*B\_S1*NUM\_S1+V\_S2*B\_S2*NUM\_S2),$$

wherein V_S1 is an amplitude of the driving signal, B_S1 is a burst of the driving signal, NUM_S1 is a number of the driving signal, V_S2 is an amplitude of the guard signal, B_S2 is a burst of the guard signal, NUM_S2 is a number of the guard signal, V_S3 is an amplitude of the first cancellation signal, B_S3 is a burst of the first cancellation signal, and NUM_S3 is a number of the first cancellation signal.

8. The touch sensor of claim 7, wherein the second cancellation channel includes:

a second-first cancellation channel configured to transmit a second-first cancellation signal having a third harmonic frequency, the third harmonic frequency of the second-first cancellation signal being three times the fundamental frequency, and having an inverse phase of a third harmonic frequency of the driving signal; and a second-second cancellation channel configured to transmit a second-second cancellation signal having a fifth harmonic frequency, the fifth harmonic frequency of the second-second cancellation signal being five times the fundamental frequency, and having an inverse phase of a fifth harmonic frequency of the driving signal.

9. The touch sensor of claim 8, wherein the second-first cancellation signal and the second-second cancellation signal satisfy an inequality $$V\_S3*B\_S3*NUM\_S3>V\_S4*B\_S4*NUM\_S4>V\_S5*B\_S5*NUM\_S5,$$

wherein V_S4 is an amplitude of the second-first cancellation signal, B_S4 is a burst of the second-first cancellation signal, NUM_S4 is a number of the second-first cancellation signal, V_S5 is an amplitude of the second-second cancellation signal, B_S5 is a burst of the second-second cancellation signal, and NUM_S5 is a number of the second-second cancellation signal.

10. The touch sensor of claim 6, wherein the first and second cancellation channels are separated from the driving channel with the guard channel between the first and second cancellation channels and the driving channel.

11. A method of driving a touch sensor, the method comprising:

generating a driving signal having a fundamental frequency;

generating a first cancellation signal having the fundamental frequency and having an inverse phase of the driving signal;

generating a second cancellation signal having an harmonic frequency of the fundamental frequency and having an inverse phase of an harmonic frequency of the driving signal; and transmitting the driving signal, the first cancellation signal, and the second cancellation signal.

12. The method of claim 11, wherein the driving signal is a square wave.

13. The method of claim 12, wherein the first cancellation signal is a square wave or a sine wave.

14. The method of claim 12, wherein the second cancellation signal is a square wave or a sine wave.

15. The method of claim 11, wherein the harmonic frequency of the fundamental frequency is an odd multiple of the fundamental frequency.

16. The method of claim 11, further comprising:

generating a guard signal having the fundamental frequency and having a same phase as the driving signal.

17. The method of claim 16, wherein the first cancellation signal satisfies an inequality $$0.9*(V\_S1*B\_S1*NUM\_S1+V\_S2*B\_S2*NUM\_S2)\leq V\_S3*B\_S3*NUM\_S3\leq 1.1*(V\_S1*B\_S1*NUM\_S1+V\_S2*B\_S2*NUM\_S2),$$

wherein V_S1 is an amplitude of the driving signal, B_S1 is a burst of the driving signal, NUM_S1 is a number of the driving signal, V_S2 is an amplitude of the guard signal, B_S2 is a burst of the guard signal, NUM_S2 is a number of the guard signal, V_S3 is an amplitude of the first cancellation signal, B_S3 is a burst of the first cancellation signal, and NUM_S3 is a number of the first cancellation signal.

18. The method of claim 17, wherein the generating the second cancellation signal includes:

generating a second-first cancellation signal having a third harmonic frequency, the third harmonic frequency of the second-first cancellation signal being three times the fundamental frequency and having an inverse phase of a third harmonic of the driving signal; and generating a second-second cancellation signal having a fifth harmonic frequency, the fifth harmonic frequency of the second-second cancellation signal being five times the fundamental frequency and having an inverse phase of a fifth harmonic frequency of the driving signal.

19. The method of claim 18, wherein the second-first cancellation signal and the second-second cancellation signal satisfy an inequality $$V\_S3 * B\_S3 * NUM\_S3 > V\_S4 * B\_S4 * NUM\_S4 > V\_S5 * B\_S5 * NUM\_S5,$$

wherein V_S4 is an amplitude of the second-first cancellation signal, B_S4 is a burst of the second-first cancellation signal, NUM_S4 is a number of the second-first cancellation signal, V_S5 is an amplitude of the second-second cancellation signal, B_S5 is a burst of the second-second cancellation signal, and NUM_S5 is a number of the second-second cancellation signal.

20. An electronic device comprising:

a display device including a display panel and a touch sensor on the display panel; and a processor configured to provide input image data to the display device, wherein the touch sensor comprises:

a touch driver configured to generate a plurality of signals; and a plurality of channels configured to transmit the plurality of signals, the plurality of channels including:

a driving channel configured to transmit a driving signal having a fundamental frequency;

a first cancellation channel configured to transmit a first cancellation signal having the fundamental frequency and having an inverse phase of the driving signal; and a second cancellation channel configured to transmit a second cancellation signal having an harmonic frequency of the fundamental frequency and having an inverse phase of a harmonic frequency of the driving signal.

* * * * *